United States Patent [19]

Drutchas, deceased

[11] Patent Number: 4,986,689

[45] Date of Patent: Jan. 22, 1991

[54] BALL JOINT

[75] Inventor: Gilbert H. Drutchas, deceased, late of Birmingham, Mich., by Elaine M. Drutchas, legel representative

[73] Assignee: TRW Inc., Lyndhurst, Ohio

[21] Appl. No.: 405,415

[22] Filed: Sep. 11, 1989

Related U.S. Application Data

[63] Continuation of Ser. No. 141,937, Jan. 11, 1988, abandoned.

[51] Int. Cl.$^5$ .................. F16C 11/08; F16D 27/02
[52] U.S. Cl. .................................. 403/127; 403/130; 403/135; 192/21.5
[58] Field of Search .................. 403/27, 39, 40, 127, 403/130–132, 135, 138, 139, 140, 122, 144, 128; 192/21.5; 252/74; 188/267

[56] References Cited

U.S. PATENT DOCUMENTS

| | | | |
|---|---|---|---|
| 2,665,789 | 1/1954 | Ingersoll | 192/21.5 |
| 2,667,237 | 1/1954 | Rabinow . | |
| 2,754,946 | 7/1956 | Trickey | 192/21.5 |
| 2,809,731 | 10/1957 | Rau | 192/21.5 |
| 3,041,094 | 6/1962 | Herbenar | 403/130 X |
| 3,240,509 | 3/1966 | Pierce | 403/127 X |
| 3,672,476 | 6/1972 | Hendershot | 192/21.5 |
| 4,035,094 | 7/1977 | Herbenar . | |
| 4,444,298 | 4/1984 | Stangroom . | |
| 4,668,417 | 5/1987 | Goossens et al. | 252/74 X |
| 4,712,940 | 12/1987 | Wood, Jr. | 403/122 X |
| 4,772,407 | 9/1988 | Carlson | 252/74 |

FOREIGN PATENT DOCUMENTS 0006911 1/1981 Japan ........................ 403/122

Primary Examiner—Peter M. Cuomo
Attorney, Agent, or Firm—Tarolli, Sundheim & Covell

[57] ABSTRACT

A ball joint including a socket defining a chamber and having an opening. The ball joint also includes a ball stud having a ball portion and a shank portion. The ball portion is located in the chamber of the socket. The shank portion of the ball stud projects through the opening in the socket. The chamber has a shape generally conforming to the shape of the ball portion of the ball stud. Electrorheological fluid is interposed between the ball portion of the ball stud and the socket for resisting relative movement between the ball stud and socket. The viscosity of the electrorheological fluid is variable as a function of the magnitude of an electric field applied thereto to vary the resistance to relative movement between the ball stud and the socket. The electric field applied to the electrorheological fluid is controlled to control the viscosity of the electrorheological fluid and thereby control the relative movement between the ball stud and the socket.

7 Claims, 4 Drawing Sheets

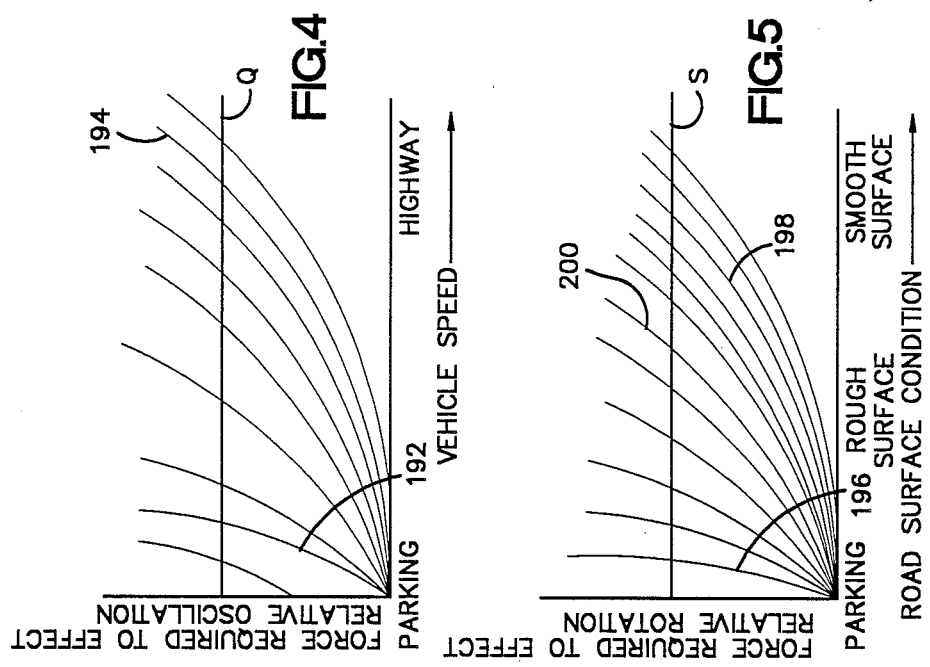
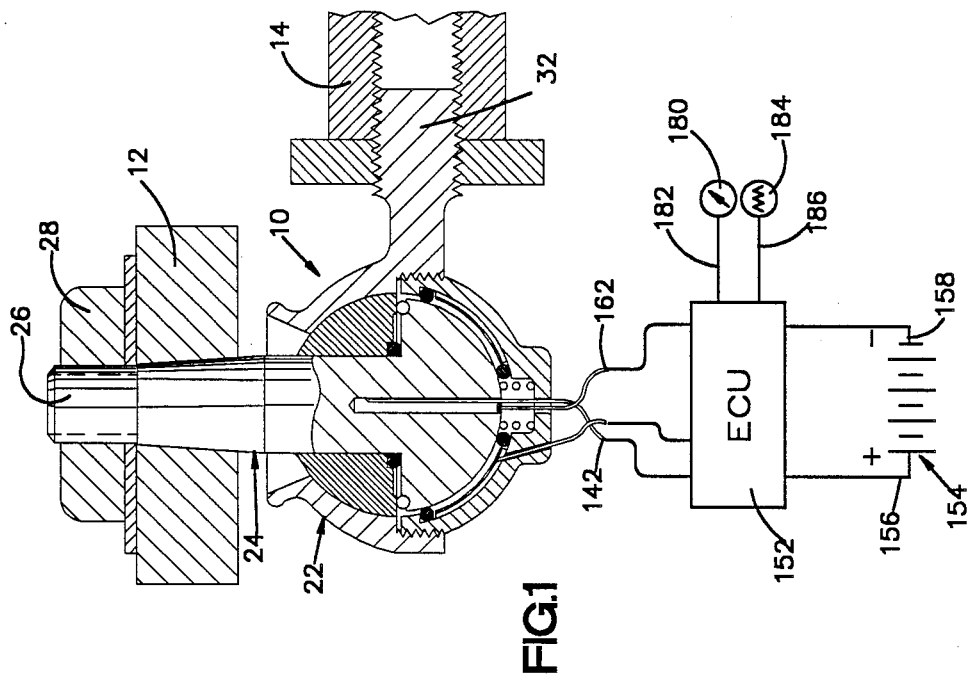

BALL JOINT

This is a continuation of co-pending application Ser. No. 07/141,937 filed on Jan. 11, 1988, now abandoned.

BACKGROUND OF THE INVENTION

The present invention relates to a ball joint, and particularly to a ball joint comprising a socket and ball stud.

2. Description of the Prior Art

Ball joints are known and include a ball stud and socket. The socket has a chamber and an opening. The ball stud has a ball portion located in the chamber and a stud portion extending from the ball portion through the opening. A bearing is disposed between the ball portion of the ball stud and the socket. The ball stud is rotatable about its longitudinal central axis within the socket. The ball stud also pivots or oscillates relative to the socket.

A ball joint is typically used to interconnect relatively movable parts of a steering linkage or a suspension of an automotive vehicle. The ball stud is connected to one part and the socket is connected to another part. The ball stud and socket rotate and oscillate relatively during relative movement of the parts. The ball joint is so constructed that relative movement between the ball stud and socket is resisted. Thus, a predetermined force is required to overcome the resistance to relative movement. The force that is required to overcome the resistance to relative movement is relatively constant.

When the vehicle is moving at a relatively low speed, for example during a parking maneuver, it is desirable to have relatively low resistance to rotative and oscillatory movement of the ball stud and socket. Thus, the force required to overcome the resistance is correspondingly low and the vehicle may be steered with relatively little effort. However, at relatively high vehicle speed, it is desirable that a relatively large resistance to relative rotational movement between the ball stud and socket exists to give a tight or stiff steering "feel" to the operator and to damp wheel vibration that can cause wheel shimmy. It is also desirable to have an increased resistance to relative oscillation or pivotal movement between the ball stud and socket on a smooth road surface to provide a relatively firm support linkage through the ball joint. It is further desirable to have a decreased resistance to relative oscillation on a rough road surface to permit the unsprung mass of the wheel assembly to easily follow the road contour without requiring the sprung mass of the vehicle frame and body to follow the movement of the wheel assembly.

SUMMARY OF THE INVENTION

The ball joint of the present invention includes a socket defining a chamber. The socket has an opening therein. A ball stud has a ball portion located in the chamber and a stud portion extending through the opening. The chamber defined by the socket has a shape generally conforming to the shape of the ball portion of the ball stud. An electrorheological fluid is interposed between the ball portion of the ball stud and the socket for resisting relative movement between the ball stud and socket. The viscosity of the electrorheological fluid is variable as a function of the magnitude of an electric field applied thereto to vary the resistance to relative movement between the ball stud and the socket.

The magnitude of the electric field applied to the electrorheological fluid is controlled to vary the viscosity of the electrorheological fluid, and thereby control the amount of force required to effect relative movement between the ball stud and socket. The magnitude of the electric field is controlled in response to sensing at least one condition of the vehicle in which the ball joint is used. For example, the speed of the vehicle and/or the road surface upon which the vehicle is travelling may be sensed.

The electric field is applied to the electrorheological fluid by a conductive plate located within the chamber. At least a portion of the electrorheological fluid is disposed between the conductive plate and the ball portion of the ball stud. A power source has a first pole in electrical communication with the conductive plate for applying a positive charge thereto. The ball portion of the ball stud is made of an electrically conductive material. The power source has a second pole in electrical communication with the ball stud to apply a negative charge thereto.

A bearing assembly is located between the ball stud and socket to enable rotational movement of the ball stud about its longitudinal central axis relative to the socket. The bearing assembly also enables oscillatory or pivotal movement between the ball stud and socket. The viscosity of a first portion of the electrorheological fluid is controllable to resist relative rotation of the ball stud about its longitudinal central axis relative to the socket. The viscosity of a second portion of the electrorheological fluid is controllable, independent of the first portion, to resist relative oscillatory or pivotal movement between the ball stud and socket.

Resistance to relative movement between a ball stud and a socket of a ball joint, according to the present invention, is variable and controllable. Thus, the ball joint of the present invention provides significant advantages over heretofore known ball joints. Furthermore, the resistance to rotation of the ball stud about its longitudinal central axis and relative to the socket can be controlled independently of the resistance to relative oscillation or pivotal movement between the ball stud and socket.

For example, if the ball joint is used in an automotive vehicle and the vehicle is being parked, the ball joint may be controlled to provide a relatively small amount of resistance to relative rotation and oscillation between the ball stud and socket. Alternatively, when the vehicle is travelling at a relatively high speed, the ball joint may be controlled to provide a relatively large resistance to relative rotation between the ball stud and socket. Furthermore, if the vehicle is operating on a relatively smooth road surface, resistance to relative oscillation between the ball stud and socket can be increased. If the vehicle is operating on a relatively rough road, resistance to relative oscillation between the ball stud and socket can be decreased.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of a ball joint embodying the present invention;

FIG. 4 is a graph of the force required to effect relative rotational movement of the ball joints versus vehicle speed;

FIG. 5 is a graph of the force required to effect relative oscillation of the ball joints as a function of road surface condition.

DESCRIPTION OF A PREFERRED EMBODIMENT

Figure 2:
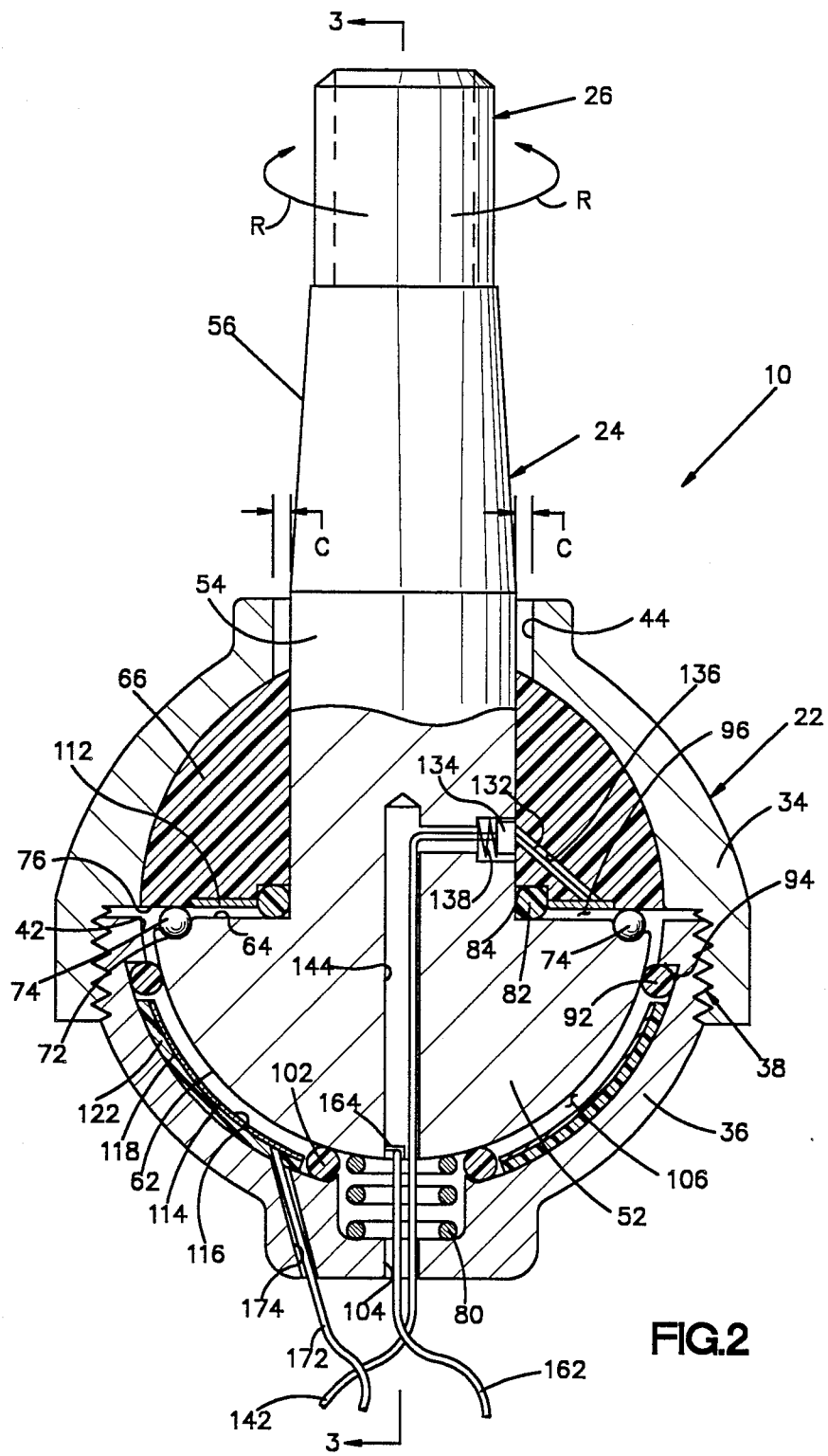
FIG. 2 is an enlarged cross sectional view of the ball joint in FIG. 1.

A ball joint 10 (FIG. 1), according to the present invention, interconnects a pair of relatively movable parts 12, 14. The pair of relatively movable parts 12, 14 are described below as parts of an automobile steering linkage, for example purposes only, and are not intended to limit the use of the present invention. It will be apparent that the ball joint 10 may also be used in an automobile suspension or in other applications.

The ball joint 10 includes a socket 22 and a ball stud 24. The ball stud 24 has an externally threaded end portion 26 for threaded engagement with a standard internally threaded nut 28 to connect the ball joint 10 to one of the relatively movable parts 12, such as a steering knuckle. The socket 22 is connected to the other part 14, such as a tie rod, by a threaded connection 32.

Figure 3:
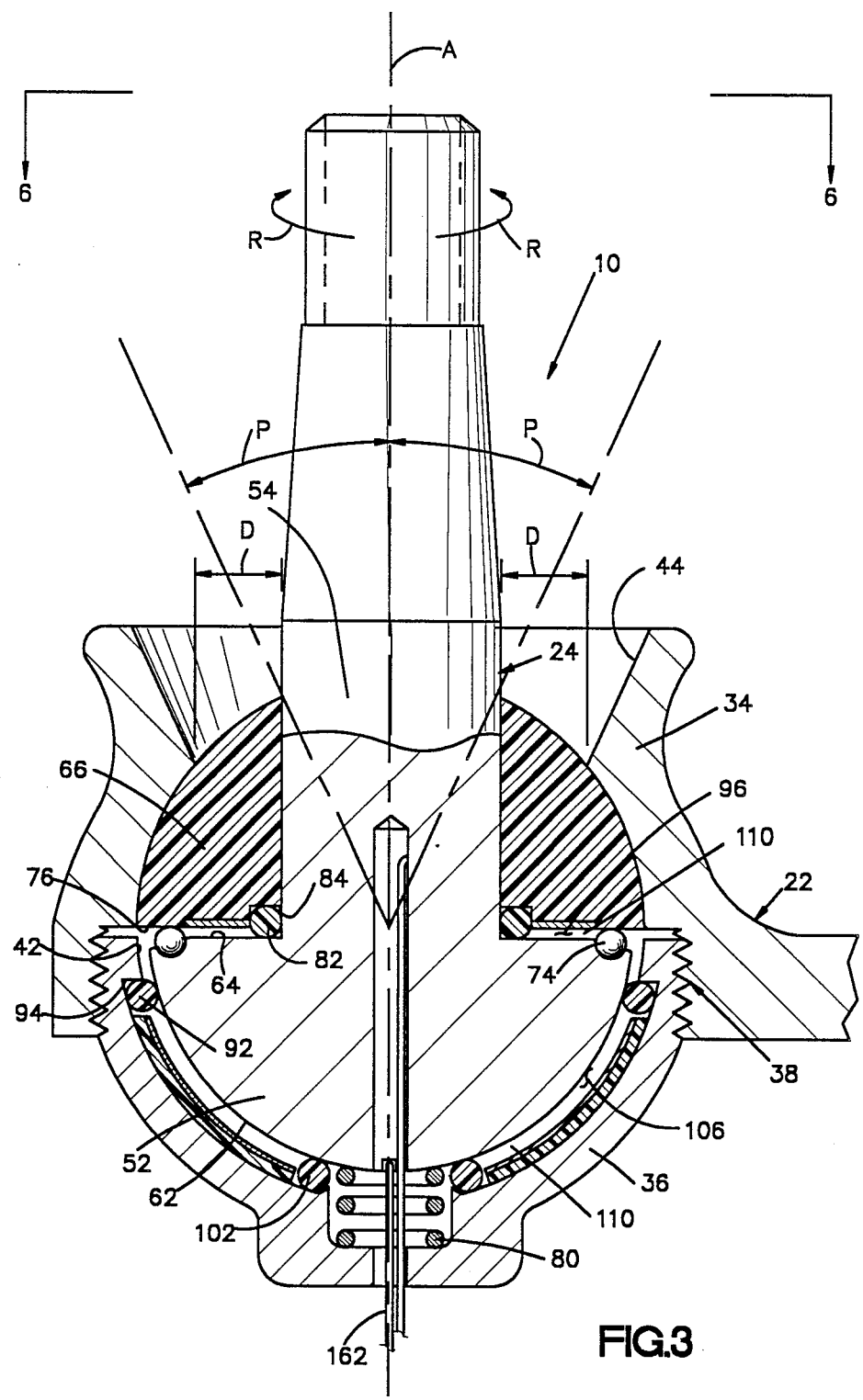
FIG. 3 is a cross sectional view of the ball joint taken approximately along line 3—3 of FIG. 2.

The socket 22 has an upper part 34, as viewed in FIGS. 2 and 3, and a lower part 36. The upper and lower parts 34, 36 of the socket 22 are connected at a threaded joint 38. It will be apparent that other techniques may be used for joining together the upper and lower parts 34, 36 of the socket 22. The socket 22 has an inner surface which defines a chamber 42 when the upper and lower parts 34, 36 are connected together. An opening 44 in the socket 22 is defined by surface areas of the socket 22. The opening 44 extends between the chamber 42 and the exterior of the upper part 34 of the ball joint 10.

The ball stud 24 includes a ball portion 52 and a stud portion 54 projecting from the ball portion. The ball portion 52 of the ball stud 24 is located within the chamber 42. The shape of the chamber 42 generally conforms to the shape of the ball portion 52 of the ball stud 24. The stud portion 54 of the ball stud 24 projects through the opening 44 in the socket 22. The stud portion 54 has a tapered portion 56 intermediate to the threaded end portion 26 and the location at which the stud portion connects to the ball portion 52. The ball stud 24 has a longitudinal central axis A. The ball stud is supported for rotational movement R in either direction about the longitudinal central axis A relative to the socket 22.

Figure 6:
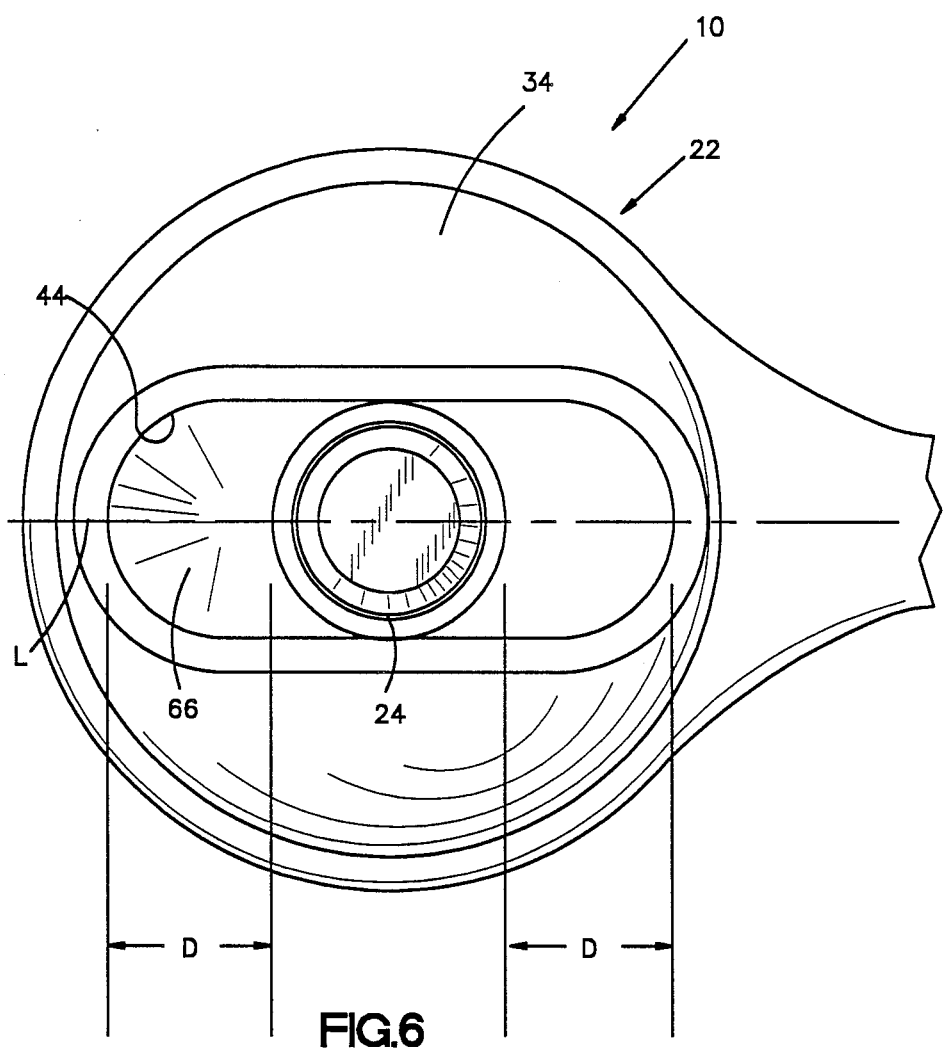
FIG. 6 is a top plan view of the ball joint taken along line 6—6 of FIG. 3.

The opening 44 (FIG. 6) in the socket is elongate and has a longitudinal central axis L. The clearance C between the stud portion 54 of the ball stud 24 and the surfaces defining the opening 44 in the direction transverse to the longitudinal central axis L of the opening 44 is relatively small. The clearance D between the stud portion 54 and the opening 44 in a direction parallel to the longitudinal central axis L of the opening is substantially larger than the clearance C. The ball stud 24 is, thus, constrained for oscillatory or pivotal movement P in a path along the longitudinal central axis L of the opening 44. This oscillatory or pivotal movement P is illustrated in FIG. 3 as approximately 25° in either direction from the initial position shown.

The ball portion 52 of the ball stud 24 has a generally hemispherical configuration with a hemispherical exterior surface 62 and a generally planar surface 64 extending in a direction perpendicular to the longitudinal central axis A of the ball stud. A bearing 66 is also disposed in the chamber 42 between the ball stud 24 and the socket 22. The bearing 66 is made of a relatively hard elastomeric material which has a relatively low electrical conductivity. The bearing 66 is also of a generally hemispherical configuration and is located within the chamber 42 and encircles the stud portion 54.

The ball portion 52 of the ball stud 24 has an annular groove 72 in the planar surface 64. A plurality of ball bearings 74 are disposed in the groove 72. The ball bearings 74 also engage a planar surface 76 of the bearing 66. A spring 80 biases or preloads the ball stud 24 against the ball bearings 74 and, in turn, the ball bearings against the planar surface 76 of the bearing 66.

The plurality of ball bearings 74 provide for relatively frictionless rotational movement R of the ball stud 24 about its longitudinal central axis A relative to the socket 22. Thus, during steering, the parts 12, 14 of the steering linkage may be easily rotated relative to one another. This enables relatively easy steering such as in a parking maneuver. The bearing 66 also enables oscillatory or pivotal movement P of the ball stud 24 relative to the socket 22 in a path along the longitudinal central axis L of the opening 44.

A first seal 82 is disposed in a groove 84 in the bearing 66. The first seal 82 prevents fluid leakage between the ball stud 24 and the bearing 66. A second seal 92 is disposed in engagement with a shoulder portion 94 of the lower socket part 36. The second seal 92 prevents fluid leakage between the lower socket part 36 and the ball portion 52 of the ball stud 24. A first fluid chamber 96 is defined as the volume between the first seal 82, the bearing 66, the inner surface of the chamber 42, the ball portion 52 of the ball stud 24, and the second seal 92.

A third seal 102 is disposed between the ball portion 52 of the ball stud 24 and lower socket part 36 adjacent the spring 80. The third seal 102 prevents fluid leakage through an opening 104 in the bottom of the lower socket part 36. A second fluid chamber 106 is defined as the volume between the second seal 92, the ball portion 52 of the ball stud 24, the inner surface of the chamber 42, and the third seal 102. The seals 82, 92, 102 are made of a material and located so they exert a relatively small amount of resistance to relative movement between the ball stud 24 and socket 22.

An electroviscous material is disposed in the first and second fluid chamber 96, 106. The electroviscous material is preferably an electrorheological fluid 110. An electric field is applied to the electrorheological fluid 110 to vary the viscosity of the electrorheological fluid. It will be apparent that other types of electroviscous material may be used, such as a magnetic fluid on which a magnetic field acts to vary the viscosity of the magnetic fluid.

The electrorheological fluid 110 is controllable to change its viscosity as a function of the magnitude of the electric field acting on the electrorheological fluid. As the viscosity of the electrorheological fluid increases, so does the resistance to relative movement between the ball stud 24 and socket 22. Thus, the force required to overcome the resistance to effect relative movement between the ball stud 24 and socket 22 is also increased.

The electrorheological fluid 110 in the first fluid chamber 96 resists rotation R of the ball stud 24 about its longitudinal central axis A relative to the socket 22 when an electric field is applied thereto. Thus, the force required to overcome the resistance to rotation of the ball stud 24 about its longitudinal central axis A relative to the socket 22 and effect rotational movement R thereof will vary as a function of the viscosity of the electrorheological fluid 110 in the first fluid chamber 96. The electrorheological fluid 110 in the second fluid chamber 106 resists relative oscillation or pivotal movement P of the ball stud 24 relative to the socket 22 when an electric field is applied to the electrorheological fluid in the second fluid chamber 106. Thus, the force required to overcome the resistance to pivotal movement P between the ball stud 24 and socket 22 will also vary as a function of the viscosity of the electrorheological fluid 110 in the second fluid chamber 106.

A first electrically conductive plate 112 (FIG. 2) is disposed in the first fluid chamber 96. The first conductive plate 112 is mounted to the bearing 66 by conventional means, such as by adhesive bonding. The ball portion 52 of the ball stud 24 is made of an electrically conductive material. A portion of the electrorheological fluid 110 in the first fluid chamber 96 is disposed between the first conductive plate 112 and the conductive ball portion 52 of the ball stud 24. When the electric field acts on the electrorheological fluid 110 in the first fluid chamber 96, the viscosity of the electrorheological fluid located between the first conductive plate 112 and the conductive ball portion 52 varies as a function of the magnitude of the electric field. For example, when a positive charge is applied to the first conductive plate 112 and a negative charge is applied to the conductive ball portion 52 of the ball stud 24, an electric field is created therebetween which acts on the electrorheological fluid 110 in the first fluid chamber 96. The viscosity of the electrorheological fluid 110 in the first fluid chamber 96 increases as the magnitude of the electric field applied thereto increases.

A wire 132 is located in a passage 136 of the bearing 66 and is fixedly connected at a first end to the first conductive plate 112. A second end of the wire 132 in the bearing 66 is in electrical communication with a brush 134. The brush 134 is biased by a spring 138 into engagement with the second end of the electrical wire 132 in the form of a slip ring which extends for an arcuate distance about the stud portion 54 of the ball stud 24 to maintain electrical contact therebetween during rotational movement R of the ball stud 24 about the longitudinal central axis A. Another wire 142 extends through the opening 104 in the lower socket part 36 and through a passage 144 in the ball portion 52 of the ball stud 24. The wire 142 is in electrical communication with the brush 134 and an electronic control unit (ECU, FIG. 1) 152. The ECU 152 generates an electrical signal which is communicated over the wires 142, 132 to apply a positive charge from a positive pole 156 of a power source 154 to the first conductor plate 112.

Another wire 162 extends through the opening 104 in the lower socket part 36 and is electrically connected at connection 164 with the conductive ball portion 52 of the ball stud 24. The connection 164 may be any known suitable electrical connection. The wire 162 is also connected with the ECU 152. The wire 162 communicates a negative charge from a negative pole 158 of the power source 154 to the conductive ball portion 52. An electrical field is created between the first conductive plate 112 and the ball portion 52 of the ball stud 24 when a positive charge is applied to the first conductive plate and a negative charge is applied to the ball portion. The electric field acts on the electrorheological fluid 110 located in the first fluid chamber 96. Thus, the viscosity of the electrorheological fluid 110 which establishes the resistance to rotational movement R of the ball stud 24 about the axis A relative to the socket 22 is varied. The viscosity of the electrorheological fluid 110 in the first fluid chamber 96 may be increased by increasing the magnitude of the electric field applied thereto.

The electrorheological fluid 110 in the second fluid chamber 106 resists oscillatory or pivotal movement P between the ball stud 24 relative to the socket 22 when an electrical field is applied to the electrorheological fluid. The viscosity of the electrorheological fluid 110 in the second fluid chamber 106 varies as a function of the magnitude of the electrical field applied thereto. Thus, as the electric field applied to the electrorheological fluid 110 in the second fluid chamber 106 increases, the resistance to oscillation or pivotal movement P between the ball stud 24 and the socket 22 increases.

A second electrically conductive plate 114 is disposed in the second fluid chamber 106. The second conductive plate 114 has a generally hemispherical configuration. The second conductive plate 114 has a concave surface 116 disposed towards the ball portion 52. A convex surface 118 of the second conductive plate 114 is bonded to an insulator 122 which is bonded to the lower socket case 36. The electrorheological fluid 110 in the second fluid chamber 106 is located between the second conductive plate 114 and the conductive ball portion 52 of the ball stud 24.

A third wire 172 extends through a passage 174 in the lower socket case 36 and through the insulator 122. The third wire 172 is connected at one end to the second conductive plate 114. The third wire 172 is also connected to the ECU 152. When the ECU 152 communicates a positive charge to the second conductive plate 114 and a negative charge to the ball portion 52, the viscosity of the electrorheological fluid 110 located in the second fluid chamber 106 is varied to establish the resistance to relative oscillation or pivotal movement P of the ball stud 24 and socket 22 as a function of the magnitude of the electric field acting thereon.

The ECU 152 controls the magnitude of the electric fields acting on the electrorheological fluid 110 in the respective first and second fluid chambers 96, 106 independently of each other. Thus, the ECU 152 controls the resistance to relative movement between the ball stud 24 and socket 22. The ECU 152 varies the resistance to relative movement between the ball stud 24 and socket 22 in response to sensing certain predetermined conditions of the ball joint 10. The ECU 152 is connected with a pair of sensors 180, 184 by wires 182, 186 (FIG. 1). A speed sensor 180 is connected to wire 182 and senses the speed of the vehicle in which the ball joint 10 is used relative to a reference surface, such as the road that the vehicle is travelling on. The road surface sensor 184 is connected to wire 186 and senses a condition, such as smoothness or roughness, of the road surface upon which the vehicle is travelling.

The ECU 152 uses the information from the sensors 180, 184 as input parameters for a control program to determine the amount of resistance to relative movement between the ball stud 24 and socket 22 that is required. For example, the ECU 152 may be programmed to determine that the vehicle is travelling at a relatively low speed, such as would be encountered during a parking maneuver, and that the road surface is relatively smooth. The ECU 152 is programmed, according to the lower portions of curve 192 (FIG. 4) and curve 196 (FIG. 5), so a small resistance to relative rotation R and relative oscillatory or pivotal movement P between the ball stud 24 and socket 22 is required. Thus, the ECU 152 would apply little or no electric field to the electrorheological fluid 110 in the first and second fluid chambers 96, 106. This results in a relatively low resistance to relative rotation R and relative oscillation or pivotal movement P as compared to known ball joints which require a relatively constant force Q (FIG. 4) to effect relative rotation R and relatively constant force S (FIG. 5) to effect relative oscillation P. This permits easy steering during a parking maneuver.

The ECU 152 is also programmed, according to the upper portion of curve 194, to increase the magnitude of the electric field applied to the electrorheological fluid 110 in the first fluid chamber 96 when the speed of the vehicle is relatively high, as during highway driving. Thus, the force required to overcome resistance to relative rotation R is relatively large to prevent wheel shimmy and to give the operator a "stiff" or tight steering feel.

The electrical field applied to the electrorheological fluid 110 in the second fluid chamber 106 is decreased according to the lower portion of curve 198 (FIG. 5) when the ECU 152 receives a signal from the sensor 184 that the vehicle is operating on a relatively rough road surface. This permits the unsprung mass of the wheel assembly of the vehicle to follow the contour of the road surface without the sprung mass of the frame and body following the path of movement of the wheel assembly. On a smooth surface, the ECU 152 increases the resistance to relative oscillation or pivotal movement P according to the upper portion of curve 200 in order to keep a relatively firm vertical support through the ball joint 10. Thus, the resistance to relative oscillation P between the ball stud 24 and socket 22 can be varied.

A plurality of variable resistances to relative movement are programmed into the ECU 152. The variable resistances are determined as a function of vehicle speed and/or surface, as illustrated by the various curves in FIGS. 4 and 5.

From the above description of a preferred embodiment of the invention, those skilled in the art will perceive improvements, changes and modifications in the present invention. Such improvements, changes and modifications within the skill of the art are intended to be covered by the appended claims.

Having described a preferred embodiment of the invention, what is claimed is:

1. A ball joint comprising:
   a socket and a ball stud which are rotatable and pivotable relative to each other;
   said socket defining a spherical chamber and having an opening;
   said ball stud having a ball portion and a stud portion extending from said ball portion, said ball portion being located in said spherical chamber and having a spherical outer surface having a center located in said spherical chamber, said stud portion projecting through said opening and having a longitudinal central axis extending through the center of said spherical outer surface, said ball stud being rotatable relative to said socket about the longitudinal central axis of said stud portion and pivotable relative to said socket about a pivotal axis extending through the center of said spherical outer surface;
   a relatively hard elastomeric bearing located in said socket and circumscribing a portion of said stud portion of said ball stud, and a plurality of bearing elements disposed between said elastomeric bearing and a surface of said ball portion of said ball stud;
   a material in said spherical chamber for resisting relative movement between said ball stud and said socket, said material having a viscosity which varies as a function of the magnitude of an energy field acting thereon, said spherical chamber having a first chamber portion for receiving said material, the viscosity of said material in said first chamber portion resisting rotation of said ball stud relative to said socket about the longitudinal central axis of said stud portion, and said spherical chamber having a second chamber portion separated from said first chamber portion for receiving said material, the viscosity of said material in said second chamber portion resisting pivotal movement of said ball stud relative to said socket about the pivotal axis extending through the center of said spherical outer surface; and
   first and second means for applying first and second energy fields, respectively, to said material in said first chamber portion and said material in said second chamber portion, respectively.

2. The ball joint set forth in claim 1 wherein said elastomeric bearing and said ball portion define said first chamber portion and said ball portion and said socket define said second chamber portion.

3. A ball joint for connecting relatively movable parts of a vehicle, said ball joint comprising:
   a socket defining a chamber and having an opening;
   a ball stud having a ball portion and a stud portion extending from said ball portion, said ball portion being located in said chamber and said stud portion projecting through said opening;
   means associated with said ball stud for enabling rotational movement of said ball stud about its longitudinal central axis relative to said socket and for enabling pivotal movement of said ball stud relative to said socket;
   seal means defining first and second fluid chambers in said chamber defined by said socket;
   electrorheological fluid located in said first and second fluid chambers for resisting relative rotational and pivotal movement, respectively, of said ball stud and said socket, the viscosity of said electrorheological fluid in said first and second fluid chambers being controllable by an electric field applied thereto and being variable to vary the resistance to relative rotational and pivotal movement between said ball stud and said socket;
   first means for applying a first electrical field to said electrorheological fluid in said first fluid chamber to resist rotation of said ball stud about its longitudinal axis relative to said socket, said first means comprising a first conductive plate in said first fluid chamber for applying an electric field to said electrorheological fluid to control the viscosity of said electrorheological fluid in said first fluid chamber and thereby control relative rotational movement of said ball stud and socket, an electrical conductor connected to said first conductive plate for delivering electrical energy of said first conductive plate, and another electrical conductor connected to said ball stud, said electric field being applied to said electrorheological fluid in said first fluid chamber when electrical energy is delivered to said first conductive plate; and second means for applying a second electrical field to said electrorheological fluid in said second fluid chamber to resist said relative pivotal movement between said ball stud and said socket, said second means comprising a second conductive plate in said second fluid chamber for applying an electric field to said electrorheological fluid to control the viscosity of said electrorheological fluid in said second fluid chamber and thereby control relative pivotal movement of said ball stud and socket, an electrical conductor connected to said second conductive plate for delivering electrical energy to said second conductive plate, said electric field being applied to said electrorheological fluid in said second fluid chamber when the electrical energy is delivered to said second conductive plate.

4. The ball joint set forth in claim 3 further including control means for independently varying the magnitude of said electric field applied to said electrorheological fluid in said first and second fluid chambers to thereby vary the viscosity of said electrorheological fluid in said first and second fluid chambers.

5. The ball joint set forth in claim 4 further including sensor means for sensing at least one condition of the vehicle in which said ball joint is used, said sensor means generates a signal indicative of said condition and communicates said signal to said control means, said control means varies the magnitude of said electric field applied to said electrorheological fluid in response to receiving said signal.

6. The ball joint set forth in claim 5 wherein said sensor means senses the velocity at which the vehicle is travelling relative to a road surface.

7. The ball joint set forth in claim 5 wherein said sensor means senses the roughness of the road surface upon which the vehicle is travelling.

* * * * *